United States Patent [19]
Meyer

[11] 3,910,549
[45] Oct. 7, 1975

[54] APPARATUS FOR DEPOSITING REINFORCING MEMBERS IN A GRATING MOLD

[75] Inventor: Leonard S. Meyer, Columbia, S.C.

[73] Assignee: Sybron Corporation, Rochester, N.Y.

[22] Filed: Aug. 29, 1974

[21] Appl. No.: 501,643

Related U.S. Application Data

[62] Division of Ser. No. 277,332, Aug. 2, 1972, Pat. No. 3,851,038.

[52] U.S. Cl. .............................. 249/205; 249/83
[51] Int. Cl.² .................. E04G 17/00; B22D 19/00
[58] Field of Search ........... 264/261, 263, 271, 277, 264/278, 334; 249/205, 175, 176, 180, 83, 91, 92–96; 425/116; 29/160; 269/41; 214/6 DK; 221/46

[56] References Cited
UNITED STATES PATENTS

| | | | |
|---|---|---|---|
| 3,349,158 | 10/1967 | Maynard | 264/261 |
| 3,359,354 | 12/1967 | Johnson | 264/261 X |
| 3,678,147 | 7/1972 | Patchen | 264/277 X |

Primary Examiner—Francis S. Husar
Assistant Examiner—John S. Brown
Attorney, Agent, or Firm—Theodore B. Roessel; James A. Rich

[57] ABSTRACT

Reinforced plastic grating is produced by assembling fiber reinforced resin strips in two sets of intersecting stacks and transferring the stacks as a unit to a mold wherein the strips are embedded in a hardenable liquid resin. The strips are assembled in a transfer jig comprising a substantially rectangular frame with an upper and a lower row of removable support rods extending through the longer sides of the frame. A plurality of blocks, supported by these rods, define lateral and transverse channels within the frame. The reinforced strips are assembled by removing the upper support rods and placing the strips within the channels defined by the blocks. The assembled strips are then transferred to the mold by reinserting the upper support rods, positioning the jig over the mold, and removing the lower support rods. Preferably the lower rods are removed one at a time, starting at one end of the jig, so that the strips are gradually lowered into the mold. When the liquid resin has cured, the grating is removed from the mold by moving at least one of the mold walls vertically to raise an edge of the grating above the base of the mold and sliding at least one tapered ejector between the base of the mold and the grating.

12 Claims, 10 Drawing Figures

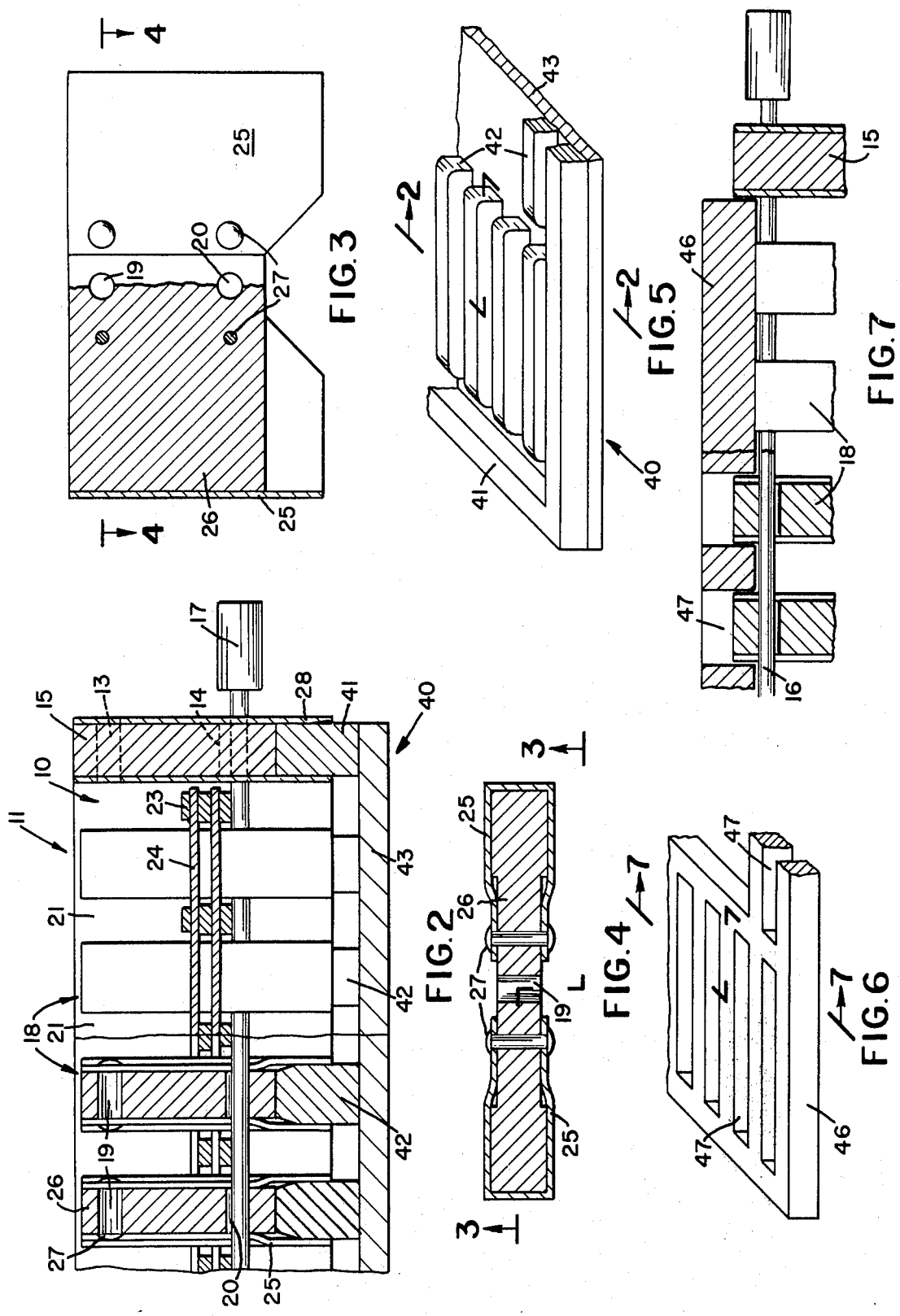

APPARATUS FOR DEPOSITING REINFORCING MEMBERS IN A GRATING MOLD

This is a division of application Ser. No. 277,332, filed Aug. 2, 1972, and now U.S. Pat. No. 3,851,038.

BACKGROUND OF THE INVENTION

This invention relates to molding methods and apparatus, and more particularly to methods and apparatus for producing reinforced plastic articles, such as gratings, filter plates, distillation support grids and the like.

Reinforced plastic gratings are used in many structural installations where corrosion resistance and/or electrical insulation are desired. Similar structures are also used in many forms of process equipment, such as filters, ion exchange units, distillation towers and the like wherein an inert or chemically resistant perforated support is used to support a material such as filter media, ion exchange resins, or Raschig rings.

One form of this grating and a method for producing it are disclosed in my copending application Ser. No. 110,076, filed Jan. 20, 1971. This grating is produced by molding preformed fiber reinforced resin strips in an embedment or matrix resin. This makes it possible to utilize one resin to provide the maximum strength in the reinforcing strips and another resin, as a matrix resin, to provide the corrosion resistance, electrical resistance or other properties desired in the finished grating. Furthermore, since the preformed strips are easy to handle, the molding cycle times are relatively short as compared to previous techniques for producing reinforced grating; and elaborate equipment for handling the reinforcement is not required. However, when the gratings are produced by placing the strips in the mold one at a time, a considerable amount of time is spent in loading the mold, which reduces the amount of grating which can be produced by any given mold. Also, since the strips must be brought one at a time to the mold, which is not very portable; it is difficult to utilize automatic strip handling equipment, which is also not very portable, in this process.

Another problem with the method disclosed in this application is that the operator must be quite careful in adding the reinforcing strips to the resin in the mold. Once the strips are placed in the resin they sink out of sight. Thus, the operator must constantly keep track of where he has added strips to make sure that he gets the strips arranged properly. Furthermore, the strips can tilt sideways as they sink through the liquid resin, which prevents the strips above them from reaching the proper position in the mold.

Removing the finished grating from the mold creates additional problems. The grating must be lifted straight up out of the mold with very little bending or cocking or it will bind on the mold projections and/or walls. This can be accomplished by installing knock-out pins in the mold base plate; however, with a typical grating a large number of pins and means to operate the pins simultaneously are required. This makes the system rather complicated. Also, installation of the knock-out pins in the base plate creates openings into which the embedment resin can leak. Thus, mold cleaning problems are increased.

SUMMARY OF THE INVENTION

It is an object of this invention to provide improved methods and apparatus for molding reinforced plastic articles.

Another object is to provide molding methods and apparatus that reduce the time required to load a mold with preformed reinforcing members.

Another object is to provide methods and apparatus for introducing preformed reinforcing members into molds that facilitate the use of automatic equipment for handling the reinforcing members.

Yet another object is to provide methods and apparatus for placing reinforcing members in a specified pattern in a mold that enable the operator to check his work more easily and efficiently.

The invention provides a method for molding reinforced plastic articles wherein preformed solid reinforcing members are assembled in a plurality of layers to form two sets of intersecting stacks. The stacks are then transferred as a unit to a mold wherein the reinforcing members are embedded in a hardenable liquid resin and the liquid resin is cured.

Preferably, the reinforcing members are assembled in a transfer jig comprising a frame having a central opening extending through the frame from top to bottom and a plurality of holes in at least one side of the frame, some of the holes being located near the top of the frame and others of the holes being located near the bottom of the frame. Removable upper support members extend through the holes near the top of the frame into the central opening and removable bottom support members extend through the holes near the bottom of the frame into the central opening. A plurality of blocks define longitudinal and transverse channels in the central opening. Each of the blocks has at least one hole through which one of the upper support members extends and at least one hole through which one of the lower support members extends. The reinforcing members are assembled in intersecting stacks in the jig by removing the upper support members and depositing the reinforcing members in the channels defined by the blocks. The stacked reinforcing members are then transferred as a unit to a mold by reinserting the upper support members, positioning the frame above the mold and removing the lower support members.

Since the reinforcing members are transferred to the mold as a unit, the mold loading time is reduced substantially, and the operator can check the assembled reinforcing members to be sure they are arranged properly before transferring them to the mold. Also, since the reinforcing members can be preassembled at a location removed from the mold, it is easier to arrange automatic equipment for handling the reinforcing members.

A further object of this invention is to provide methods and apparatus for gradually lowering a number of thin, preformed reinforcing strips into a mold as a unit in order to prevent any of the strips from turning on edge as they are lowered. This is accomplished by assembling the strips in a transfer jig having a plurality of removable support members upon which the strips are placed; and transferring the strips to the mold by positioning the jig above the mold and removing the support members one at a time from beneath the assembled strips. Preferably, pressure is applied to the tops of the assembled strips as they are lowered.

A still further object of this invention is to provide improved methods and apparatus for minimizing tilting and bending of an article when it is ejected from a mold. A movable mold wall, which defines a ledge on which an edge of the article rests, is positioned adjacent to the base of the mold. This wall is moved vertically to raise that edge above the base of the mold; and at least one bayonet wedge ejector is slid through an opening in the raised wall to lift the article further.

Other objects and advantages of this invention will be apparent from the following description.

DESCRIPTION OF THE DRAWINGS:

FIG. 2 is a cross-sectional elevation view, taken along lines 2—2 of FIGS. 1 and 5, showing the jig being loaded.

FIGS. 3 and 4 are detailed views of one of the blocks from the jig.

FIGS. 5 and 6 are fragmentary isometric views of two block alignment fixtures used to maintain the desired spacing of the blocks in the jig when the jig is empty.

FIG. 7 is a cross-sectional elevation view from the same vantage point as FIG. 2, showing an empty jig with the top block alignment fixture installed.

DETAILED DESCRIPTION

Figure 1:
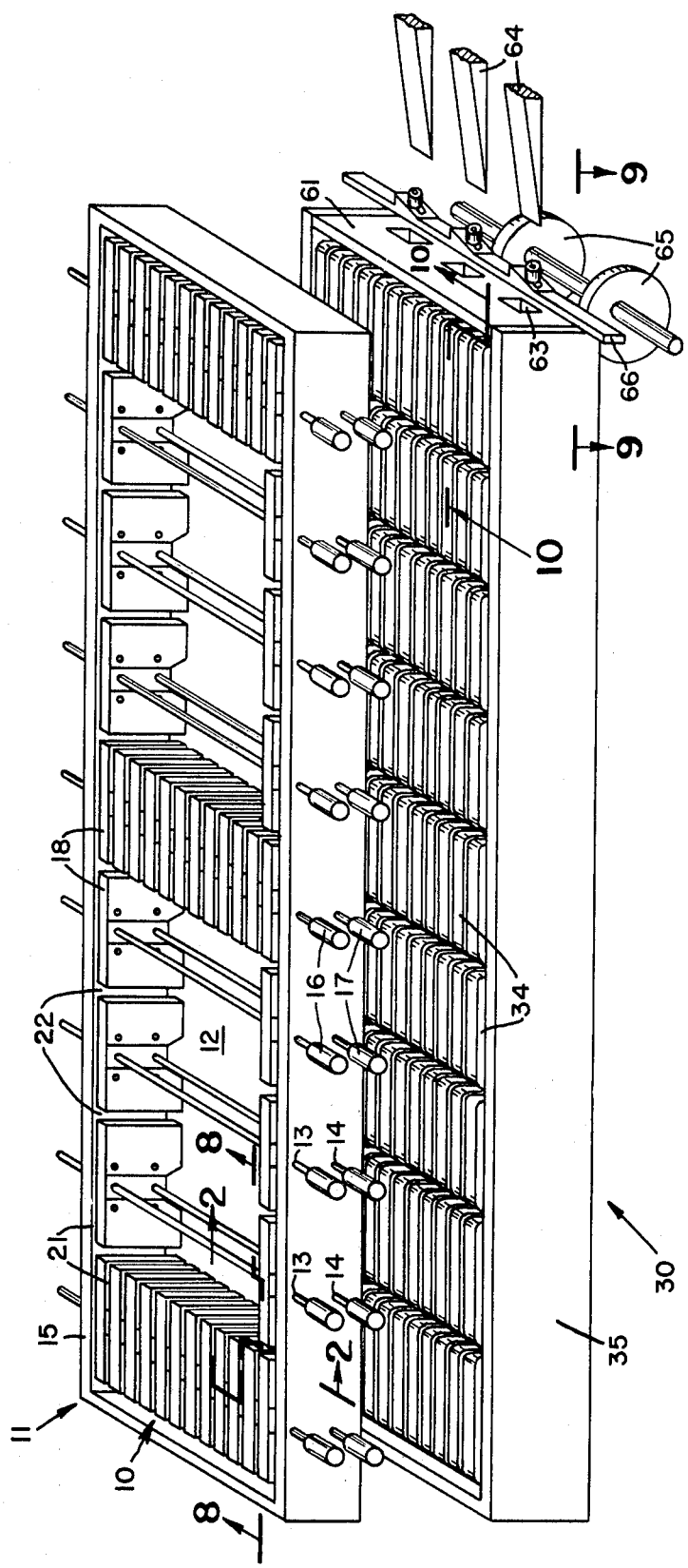
FIG. 1 is an isometric view of a transfer jig and mold embodying this invention.

FIG. 1 illustrates a transfer jig 10 and mold 30 which may be used to produce plastic grating, having a 1 inch by 4 inch grid, reinforced with preformed fiber reinforced resin strips such as those disclosed in the co-pending application referred to above. For purposes of illustration, the jig is shown suspended above the mold. However, in normal operation, the jig is taken to a location adjacent to the mold for loading. The loaded jig is then set on top of the mold while the reinforcing strips are transferred to the mold. FIG. 2 shows the jig being loaded and FIG. 8 shows the transfer to the mold.

Jig 10 includes a substantially rectangular frame 11 having a central opening 12 extending through the frame from top to bottom. An upper row of holes 13 and a lower row of holes 14 are substantially equally spaced along each of the longer sides 15 of frame 11. Each hole is aligned with a hole in the opposite side of the frame. Removable upper support rods 16 extend through the upper holes 13 and removable lower support rods 17 extend through the lower holes 14. Each support rod extends through a hole in one side of the frame, across the central opening 12, and through the aligned hole in the opposite side of the frame.

A plurality of thin, rectangular blocks 18 are supported within the central opening 12 by the upper and lower support rods 16, 17. Each block has an upper hole 19 through which one of the upper support rods 16 extends and a lower hole 20 through which one of the lower support rods 17 extends. As may be seen in FIGS. 2 and 8, the holes 13, 14 in the frame and the holes 19, 20 in the blocks are slightly larger than the support rods 16, 17 so that the rods may be removed easily and the blocks can move relative to the rods to center themselves properly.

Figure 8:
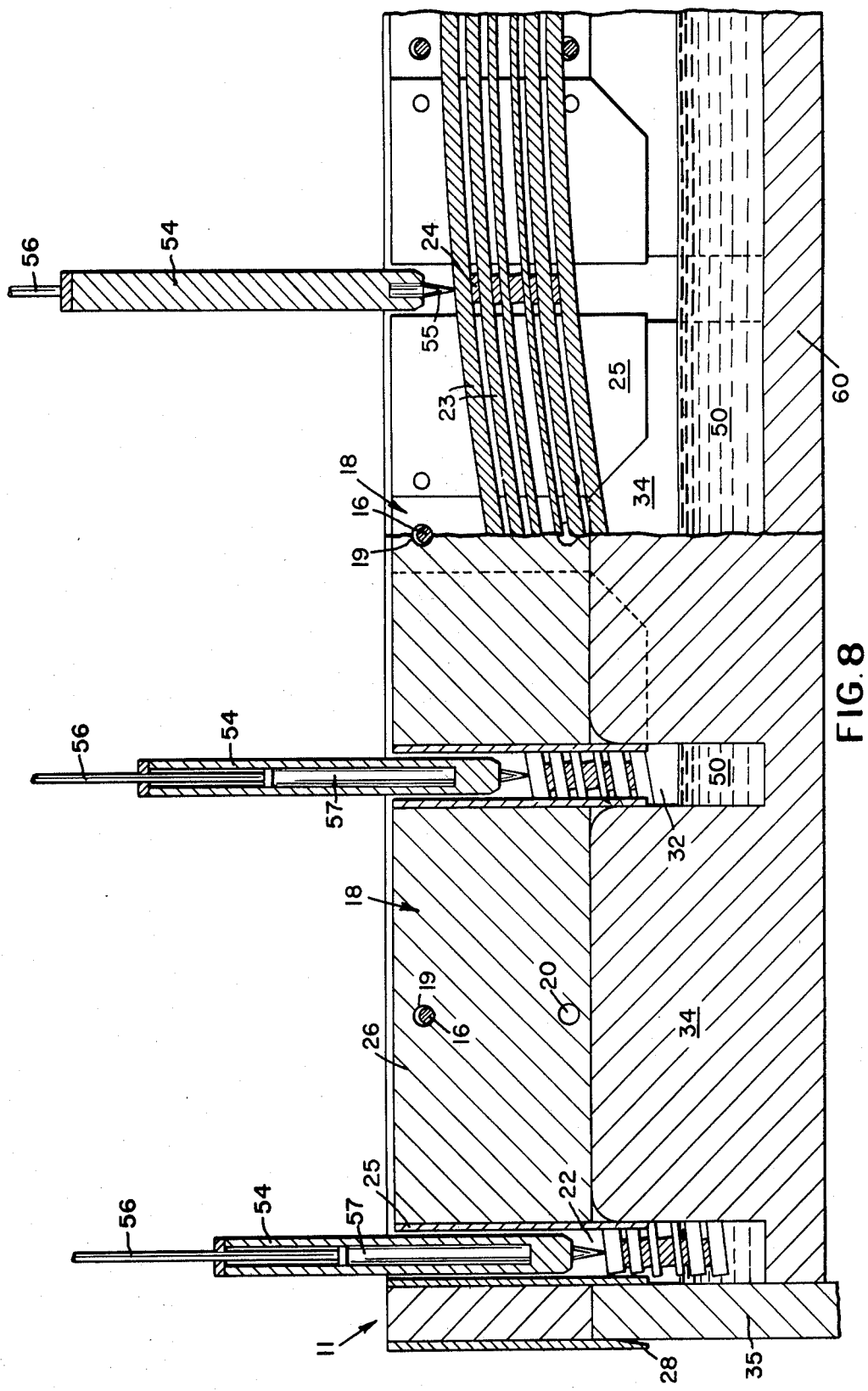
FIG. 8 is a cross-sectional elevation view of the jig and mold, along lines 8—8 of FIG. 1, showing the reinforcing members being transferred from the jig to the mold.

The blocks 18 are arranged on the support rods 16, 17 to define longitudinal channels 21, best seen in FIG. 2, and transverse channels 22, best seen in FIG. 8, in the central opening 12. Fiber reinforced resin strips 23, 24 are placed in the longitudinal and transverse channels 21, 22 to form two sets of intersecting stacks. As shown, it is generally preferable to provide alternating layers of span strips 23 and tie strips 24, with the strips in each layer crossing the strips in adjacent layers, so that the reinforcing strips are distributed fairly uniformly through the span and tie bars of the grating.

When the jig is positioned above the mold, each block 18 is directly over one of a number of projections or core members 34 extending from the base of the mold. The projections 28 define longitudinal and transverse channels 31, 32, best seen in FIG. 9, in the mold. These channels correspond to the longitudinal 21 and transverse channels 22 in the jig. The span bars of the grating are formed in the longitudinal channels 31, while the tie bars are formed in the transverse channels 32.

In order to insure that each block 18 is centered over the corresponding projection in the mold, each block is provided with a depending skirt 25 that fits over one of the projections 34. The tops of the projections are rounded, and, as was mentioned above, the blocks 18 are free to move slightly with regard to the support rods 16 and 17. Thus, as the jig is set on top of the mold, the blocks automatically align themselves with the proper projections, and the reinforcing strips are positioned above the longitudinal and transverse channels 31 and 32 in the mold.

Preferably, the skirts 25 are made of a material that is thin but relatively strong, such as sheet metal. The block illustrated in FIGS. 3 and 4 has a core 26, preferably made of wood, plastic or some other easily workable material, and the skirt 25 consists of two pieces of sheet metal riveted to the core. As is best shown in FIG. 4, the center of the core is recessed so that the rivets 27 will not stick out into the longitudinal channels in the jig and interfere with either insertion of the reinforcing strips or transfer of the strips to the mold.

The frame 11 of the jig is also provided with a sheet metal skirt 28. As shown in FIG. 8, this skirt fits over the wall 35 of the mold and centers the frame over the mold when the frame is set on top of the mold.

The skirts on the blocks and on the frame are also used to align the blocks for loading. As shown in FIG. 2, during loading the jig sits on a block alignment fixture, generally referred to as 40, which is also shown in FIG. 5. This alignment fixture has a base 43, at least one projection 41 adapted to fit within the skirt 28 on the frame, and a plurality of projections 42 adapted to fit within the skirts 25 on the blocks. The block alignment fixture may be attached to a movable carriage in order to successively align the channels in the jig with automatic strip handling equipment. This is one of the wide variety of steps which, because the jig is light and portable, may be taken to automate the laying up of the strips.

A second block alignment fixture 45, shown in FIGS. 6 and 7, is used to keep the blocks in the proper alignment when the jig is being moved from the mold back to the loading station. This fixture comprises a frame 46 having a number of openings 47 therein. As best shown in FIG. 7, the tops of the blocks 18, which extend above which extend above the upper support rods 16, fit into these openings.

The projections on the illustrated bottom block alignment fixture 40 and the openings in the illustrated top alignment fixture 45 are arranged in the same pattern as the blocks 18 in the jig. However, if different block arrangements are likely to be encountered, as may happen when different reinforcing members are used, it may be desirable to provide additional projections and openings so that the different block arrangements can be handled with the same alignment fixtures.

As may be seen in FIG. 1, in the illustrated system there are not as many blocks 18 in the jig as there are projections 34 in the mold. In any arrangement, there should be at least one row of blocks at or near each end and each side of the frame so that each end of each reinforcing strip is held in place. Depending on the stiffness and straightness of the reinforcing members, and the size of the jig, additional rows of blocks in the transverse and/or longitudinal direction may be desirable. In the illustrated system, a transverse row of blocks is provided in the center of the jig to hold the span bar reinforcing strips in place.

After the strips have been assembled in the jig, the upper support rods 16 are reinserted and the jig is placed on top of the mold, as shown in FIG. 8. The lower support rods 17 are then removed and the assembled strips are transferred as a unit to the mold. Preferably, the hardenable liquid resin 50 in which the strips are to be embedded is poured into the mold before the strips are inserted. Thus, when the strips are lowered into the mold, the liquid resin 50 is forced into the spaces between the strips, which helps prevent voids in the finished grating.

As is shown in FIG. 8, preferably the strips are gradually lowered into the mold by removing the lower support rods 17 one at a time, starting at one end of the mold, while pressure is exerted on the top of the assembled strips. This helps insure that the strips are gradually lowered as a unit and prevents individual strips from turning, or cocking, like an errant coin in a coin wrapper, and preventing strips above them from settling to the desired position in the mold. In the illustrated system, the pressure is exerted by weighted bars 54, each of which has a number of pins 55 depending therefrom. The pins are arranged to contact the top layer of reinforcing strips at the spots where the tie and span bar reinforcing strips cross. One of the bars 54 is positioned over each of the transverse channels 22 in the transfer jig. The bars are held in place by rods 56 that extend into bores 57 in the bars.

The pins do not displace much liquid resin when they push the strips beneath the surface of the resin. Thus, the weighted bars may be used to hold the strips in place until the liquid resin cures without producing large holes or other irregularities in the surface of the finished grating. It is sometimes desirable to hold the strips in place in this fashion, particularly if any of the strips are bowed, so that they will not spring up out of position when the pressure is removed.

If the weighted bars are used to hold the strips in place while the liquid resin cures, it is generally preferable to use two transfer jigs so that one can be left on top of the mold and the other can be loaded while the resin is curing. If the weighted bars are not used to hold the strips in place during curing, the transfer jig can be moved back to the loading station and refilled as soon as the strips have been transferred to the mold. With either system of operation, as soon as the liquid resin 50 has cured and the finished grating has been removed from the mold, another set of reinforcing strips will be ready for introducton into the mold as a unit. As a result, the proportion of the mold cycle time needed for introduction of the strips is reduced and the amount of grating that can be produced by the mold is increased.

The transfer jig also gives the operator a chance to check his work before he finally transfers the reinforcing strips to the mold. Since the strips are readily visible when they are in the jig, the operator can check his work after he has assembled the strips. Thus, the chances of putting too few or too many strips in one of the channels in the mold and the chances of getting one of the strips in an improper position are greatly reduced.

Figure 9:
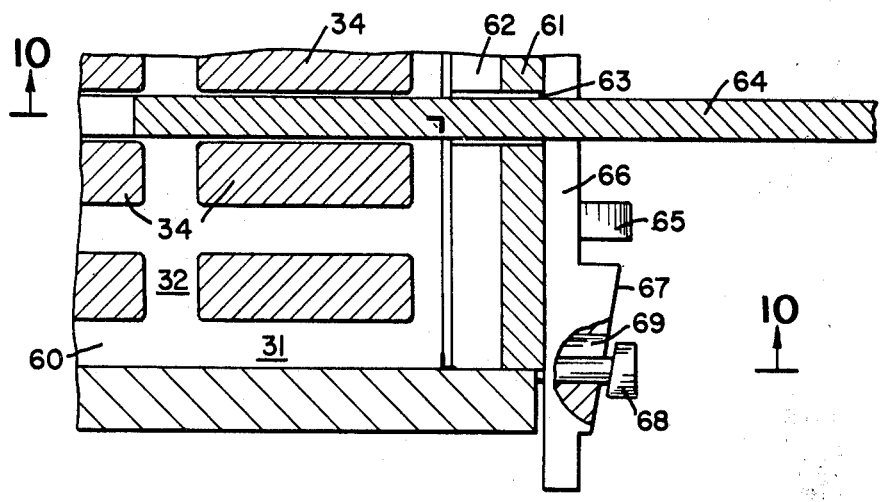
FIG. 9 is a cross-sectional plan view, along lines 9—9 of FIGS. 1 and 10, illustrating the means for removing the finished grating from the mold.
Figure 10:
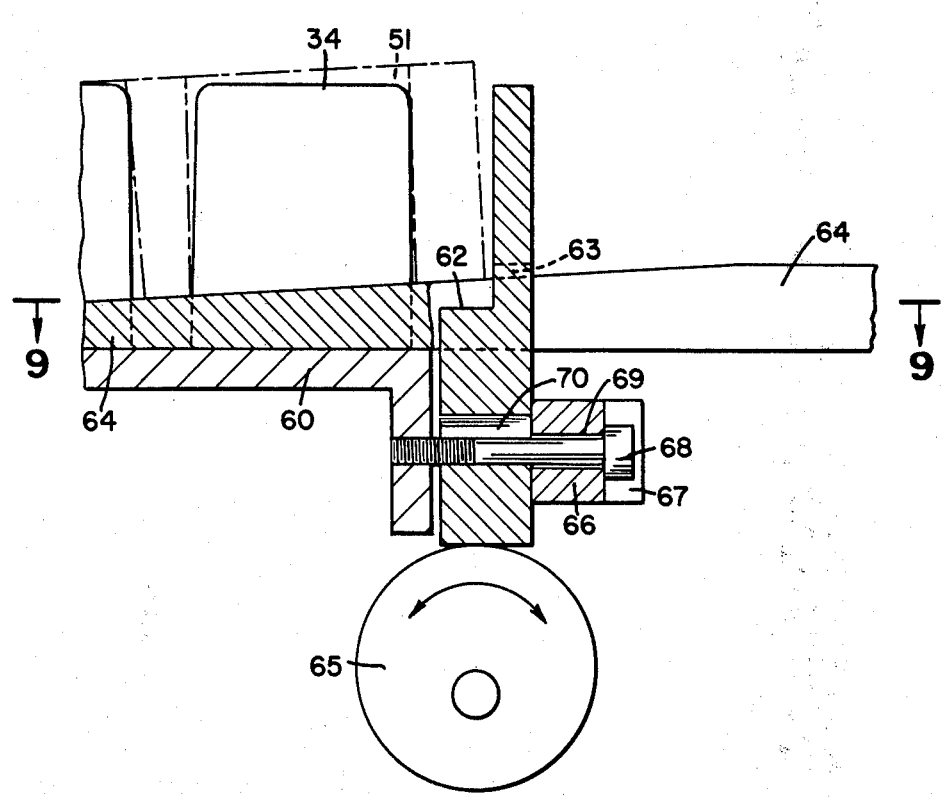
FIG. 10 is a cross-sectional elevation view, along lines 10—10 of FIGS. 1 and 9, also illustrating the means for ejecting the grating.

The preferred means for ejecting the finished grating from the mold are illustrated in FIGS. 1, 9 and 10. As shown in those figures, at least one movable mold wall 61 is positioned adjacent to the base 60 of the mold. (The projections 34 that form the openings in the grating extend from this base.) The movable mold wall 61 defines a ledge 62 on which an edge of the finished grating 51 rests. As best seen in FIG. 10, wall 61 may be moved vertically by cams 65 or other suitable means, whereby the edge of the grating that rests on ledge 62 is raised slightly above the base 60 of the mold.

The movable mold wall contains at least one hole 63 that extends above and below the ledge 62. After the wall has been moved vertically to raise the edge of the grating, bayonet wedge ejectors 64 are slid through the holes 63. As these ejectors slid between the base 60 of the mold and the finished grating 51, they raise the grating to the point where it can be lifted out of the mold by hand. Preferably a plurality of holes 63 are provided in the movable wall and ejectors are simultaneously slid in through all the holes. This prevents side to side cocking of the grating during ejection and helps distribute the load on the grating.

In some cases, as for example, where large gratings are being produced, it may be desirable to utilize movable walls at both ends of the mold, or to make one or both of the side walls movable. Shorter ejectors can be used in these alternatives. However, since they increase the number of ejectors which must be used and make the system somewhat more complex, in most cases the illustrated system, i.e., a movable wall at one end of the mold, is preferable.

This two step ejection process minimizes cocking and bending of the grating and thereby makes it possible to use small draft angles in the mold walls and/or in the projections 34. Typically, the vertical motion of mold wall 61 is very slight compared to the length of the mold. Thus, raising wall 61 does not tilt or bend the grating 51 by an appreciable amount. The ejectors 64 are tapered very gradually (the degree of taper is exaggerated in the figures for purposes of illustration) and as the ejectors are slipped under the grating the grating is raised from the mold, with a minimal amount of bending, at an angle approximating the degree of taper in the ejectors 64. Thus, the grating is never cocked, tilted or bent to any great extent and there is no need to utilize large draft angles to prevent jamming of the grating in the mold.

Since no knock-out pins or other moving parts are mounted in the base 60 of the mold, there are no crevices in the base into which liquid resin can leak. As a result, this system also simplifies cleaning of the mold. The only spots where leakage can occur are the holes 63 in the movable wall, which are closed with plugs (not shown) during the molding cycle, and the places where the movable wall meets the side walls and the base of the mold. Thus, potential leaks are minimized and are located in or around a part which can easily be removed for cleaning.

Leakage around the edges of the movable mold wall 61 is minimized by pressing this wall against the base 60 of the mold during the molding cycle. A horizontally movable bar 66 having wedge shaped cam surfaces 67 thereon is positioned adjacent the movable wall 61 and attached to the base 60 by bolts 68 or other fasteners that extend through horizontal slots 69 in the cam surfaces 67, through vertical slots 70 in the movable mold wall 61, and into the base. Moving bar 66 in one direction presses the movable wall 61 against the base of the mold. Moving the bar in the other direction allows the wall to move slightly away from the base, thereby freeing the wall for vertical movement.

Operation

To recapitulate, for loading, jig 10 is set on top of the bottom block alignment fixture 40, and the top block alignment fixture 45 and upper support rods 16 are removed. The jig is then loaded with fiber reinforced resin strips 23, 24, which are placed in longitudinal and transverse channels 21, 22 defined in the central opening 12 of jig 10 by blocks 18. The upper support rods are then reinserted and, when mold 30 is ready for the strips, the jig 10 is positioned above the mold and the assembled strips are lowered as a unit into hardenable liquid resin 50 in the mold. Since the strips are all introduced at once, the time for loading the mold is materially reduced. Thus, mold cycle times are shortened and the production capabilities of the mold are increased.

Preferably the assembled strips are lowered gradually by rmoving the lower support rods 17 one at a time, starting at one end of the mold, while weighted bars 54 exert pressure on the top of the assembled strips. This keeps the strips pressed together as they are lowered and insures that none of the strips will turn or cock as they are lowered.

After the liquid resin 50 has hardened, bar 66 is moved to allow movable mold wall 61 to move slightly away from the base 60 of the mold, thereby freeing wall 61 for vertical movement. Wall 61 is then raised by cams 65. This raises an edge of the grating 51 that rests on a ledge 62 defined by the movable wall 61 slightly above the base of the mold. One or more bayonet wedge ejectors 64 are then slid through holes 63 in the movable mold wall 61, and between the base 60 of the mold and the finished grating 51. This raises the grating to the point where it can be removed from the mold by hand. The vertical motion of the mold wall is slight compared to the length of the mold and the ejectors have a very gradual taper. Thus, the finished grating 51 is never cocked, tilted or bent to any great extent and small draft angles can be used for the mold walls and for the projections or core members 34 that produce the openings in the grating.

It should be understood that the apparatus and processes described above may be modified by those skilled in the art. For example, other types of preformed reinforcing members may be used in place of the fiber reinforced resin strips. Also, the apparatus and methods described above may be modified to produce products other than plastic grating. These and other modifications may be made within the scope of this invention, which is defined by the appended claims.

I claim:

1. Apparatus for assembling reinforcing members to be inserted in a mold comprising:

a frame having a central opening extending through the frame from top to bottom and a plurality of holes in at least one side of the frame, some of said holes being located near the top of the frame and others of said holes being located near the bottom of the frame;

removable upper support members extending through the holes near the top of the frame into the central opening and removable bottom support members extending through the holes near the bottom of the frame into the central opening;

a plurality of blocks defining longitudinal and transverse channels in the central openings, each of the blocks having at least one hole through which one of the upper support members extends and at least one hole through which one of the lower support members extends;

whereby the reinforcing members may be assembled in intersecting stacks by removing the upper support members and placing the reinforcing members in the channels, and the stacked reinforcing members may be transferred as a unit to a mold by reinserting the upper support members, positioning the frame above the mold, and removing the lower support members.

2. Apparatus according to claim 1 wherein each support member extends through a hole on one side of the frame, across the central opening and through a hole in the opposite side of the frame.

3. Apparatus according to claim 1 wherein each of said blocks has a skirt depending therefrom, said skirt being adapted to fit over a projection extending from the mold and align the block over the projection when the frame is set on top of the mold.

4. Apparatus according to claim 3 wherein the holes in each block are larger than the support members that extend through them, whereby the blocks can move relative to the support members to center themselves over the projections.

5. Apparatus according to claim 3 wherein each block has a central core, and the skirt comprises at least one piece of sheet metal attached to the core.

6. Apparatus according to claim 3 including a block alignment fixture comprising a plurality of projections adapted to fit within the skirts on the blocks.

7. Apparatus according to claim 3 further comprising a skirt on the frame adapted to fit over the walls of the mold and center the frame over the mold when the frame is set on top of the mold.

8. Apparatus according to claim 7 including a block alignment fixture comprising at least one projection adapted to fit within the skirt on the frame, and a plurality of projections adapted to fit within the skirts on the blocks.

9. Apparatus according to claim 1 wherein the blocks extend above the upper support members, including a block alignment fixture comprising a frame having a plurality of openings therein, the portions of the blocks which extend above the upper support members being adapted to fit into said openings.

10. Apparatus according to claim 1 wherein the reinforcing members are thin, preformed reinforcing strips, the holes through which the lower support members extend are substantially equally spaced along the side of the frame, and the lower support members can be removed one at a time, (whereby the assembled reinforcing strips may be gradually lowered into the mold.)

11. Apparatus according to claim 10 further comprising means for applying pressure to the tops of the assembled strips as they are lowered into the mold.

12. Apparatus according to claim 11 wherein the means for applying pressure to the tops of the assembled strips comprises a plurality of weighted bars, each of said bars having a plurality of pins depending therefrom, and means for positioning one of said bars over each of the transverse channels in the frame.

* * * * *